United States Patent [19]

Kühnlein

[11] Patent Number: 4,506,339

[45] Date of Patent: Mar. 19, 1985

[54] METHOD AND APPARATUS FOR MEASURING AND MONITORING THE RATE OF ROTATION OF FAST RUNNING MACHINES

[75] Inventor: Klaus Kühnlein, Zirndorf, Fed. Rep. of Germany

[73] Assignee: AEG-Kanis Turbinenfabrik GmbH, Nuremberg, Fed. Rep. of Germany

[21] Appl. No.: 432,404

[22] Filed: Sep. 30, 1982

[30] Foreign Application Priority Data

Nov. 13, 1981 [DE] Fed. Rep. of Germany ....... 3145162

[51] Int. Cl.³ .............................................. G01P 3/36
[52] U.S. Cl. ................................. 364/565; 324/163; 324/175; 377/15; 73/462
[58] Field of Search ................... 364/565; 377/15, 16, 377/19; 364/431.07; 324/160, 163, 173–176; 73/462, 518

[56] References Cited

U.S. PATENT DOCUMENTS

| | | | |
|---|---|---|---|
| 3,651,690 | 3/1972 | Pagdin et al. | 364/565 X |
| 4,152,645 | 5/1979 | Bendler | 324/163 |
| 4,179,656 | 12/1979 | Wagner | 364/565 X |
| 4,181,962 | 1/1980 | West, Jr. et al. | 364/565 |
| 4,195,291 | 3/1980 | Burks, Jr. | 324/175 X |
| 4,356,447 | 10/1982 | Honig et al. | 364/565 X |
| 4,358,828 | 11/1982 | Reid et al. | 364/565 |
| 4,420,814 | 12/1983 | Arikawa et al. | 364/565 |
| 4,445,087 | 4/1984 | Mehnert | 324/176 X |

FOREIGN PATENT DOCUMENTS

1223179 8/1966 Fed. Rep. of Germany.

Primary Examiner—Edward J. Wise
Attorney, Agent, or Firm—Spencer & Frank

[57] ABSTRACT

An apparatus for measuring and monitoring the angular velocity of the shaft of a rotating machine. In this apparatus, a plurality of sensors is positioned adjacent the shaft of the rotating machine for generating sequential pulses with periods proportional to the angular velocity of the shaft. The pulses are generated at intervals such that, during the period between adjacent pulses from one sensor, pulses are generated by each of the other sensors. An oscillator is provided for generating reference pulses at a predetermined pulse repetition rate, and a plurality of counting devices are coupled to respective sensors and to the output of the oscillator for counting the pulses generated by the oscillator. An averaging and reciprocal circuit is coupled to the output terminals of the counting devices for obtaining the average of the counting device outputs and then generating the reciprocal of the average value. The output of the reciprocal circuit is proportional to the angular velocity of the shaft of the rotating machine in revolutions per unit time.

18 Claims, 9 Drawing Figures

METHOD AND APPARATUS FOR MEASURING AND MONITORING THE RATE OF ROTATION OF FAST RUNNING MACHINES

BACKGROUND OF THE INVENTION

The present invention relates to a method and apparatus for measuring and monitoring the angular velocity of the shaft of a rapidly rotating machine.

The regulation of a machine which rotates at high speeds, such as a turbine, requires the constant reliable monitoring of its angular velocity and the indication in revolutions per unit time of deviations from the desired speed. In order to utilize speed proportional signals for such purposes, magnetic and optical sensors are known which are actuated by the passage of special reference markers attached to the machine shaft. For example, a frequently used system includes a toothed disc which is fastened to the machine shaft and which has teeth uniformly distributed over its circumference. Inductive sensors disposed opposite the teeth convert the passage of each tooth into a voltage pulse which is converted into a signal proportional to the speed of the machine.

A speed measuring device is disclosed in German Pat. No. 1,223,179 for the evaluation of such pulses. In this prior art arrangement, a pulse generator furnishes pulses having a pulse repetition rate which is proportional to the actual number of revolutions of the rotating machine to a pulse counter. However, this device does not indicate speed in revolutions per minute (rpm), and the single channel circuit provided does not meet present-day requirements for measurements that are accurate enough to be used in regulating devices.

Accordingly, it is an object of the invention to provide a method and apparatus of the above-mentioned type wherein a highly reliable measurement is obtained from pulse sequences having a pulse repetition rate or frequency proportional to the number of revolutions of a rotating machine, the effect of malfunctions in the speed detection device is minimized and which provides a direct indication of the speed of the machine in revolutions per minute. The invention is particularly suitable for high speed machines having angular velocities on the order of about 10,000 revolutions per minute.

SUMMARY OF THE INVENTION

In accordance with the present invention, an apparatus is provided for measuring and monitoring the angular velocity of the shaft of a rotating machine. In this apparatus, a plurality of sensors is positioned adjacent the shaft of the rotating machine for generating sequential pulses with periods proportional to the angular velocity of the shaft. The pulses are generated at intervals such that, during the period between adjacent pulses from one sensor, pulses are generated by each of the other sensors. An oscillator is provided for generating reference pulses at a predetermined pulse repetition rate, and a plurality of counting devices are coupled to respective sensors and to the output of the oscillator for counting the pulses generated by the oscillator. An averaging and reciprocal circuit is coupled to the output terminals of the counting devices for obtaining the average of the counting device outputs and then generating the reciprocal of the average value. The output of this circuit is proportional to the angular velocity of the shaft of the rotating machine in revolutions per unit time.

One advantage of the invention is that if one of the pulse generators is malfunctioning the number of revolutions can still be determined. It is therefore possible to monitor machines, in which, for safety reasons, the speed must always be known. This is the case, for example, with turbine regulation since a turbine, if it serves as a prime mover for an electric generator, must always be operated in synchronism with the power supply network.

DESCRIPTION OF THE PREFERRED EMBODIMENTS

Figure 1:
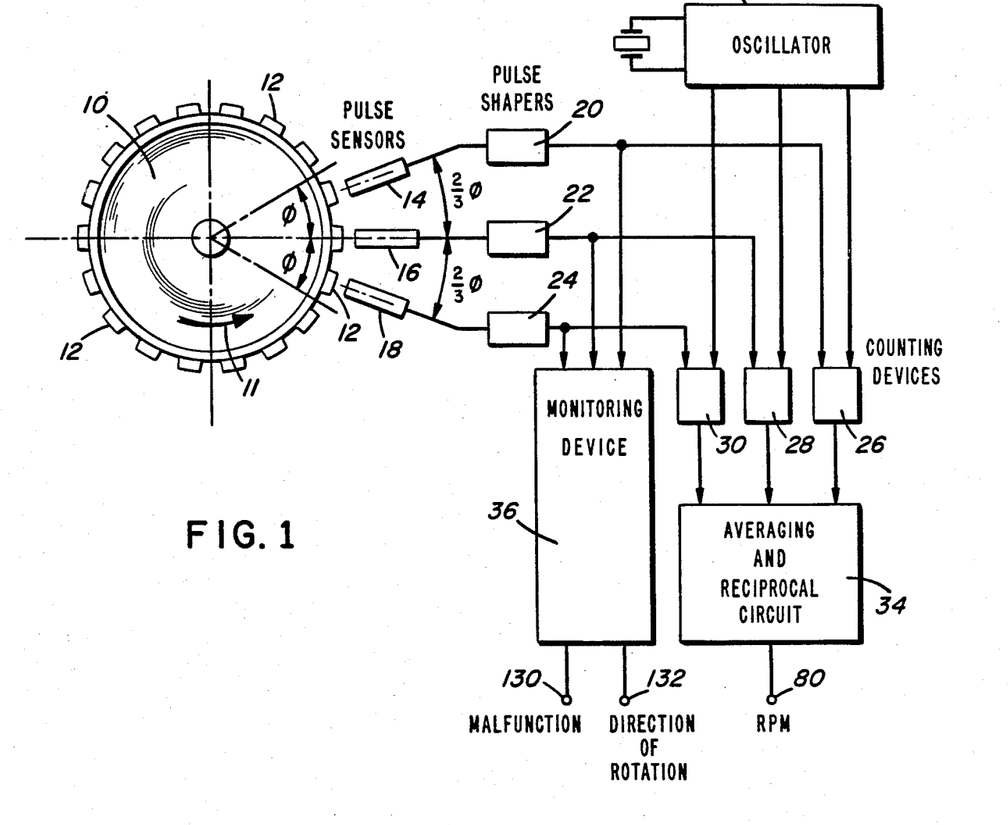
FIG. 1 is a block diagram of the invention showing a schematic arrangement for determining the angular velocity of a rotating machine.

A first embodiment of the invention is shown and disclosed in FIGS. 1–5. Referring to FIG. 1, a disc 10 having teeth 12 cut into its entire periphery is attached to the shaft of a rotating machine (not shown) whose speed is to be monitored. Sensors 14, 16 and 18, which may be magnetic or optical sensors of the type described in Bulletin L 1001-00 Bently—Nevada, Minden, Nev. U.S.A. 89423. are distributed along the circumference of and spaced from the toothed disc 10 at uniform distances from one another. Each of the sensors 14, 16 and 18 generates a pulse when a tooth passes by.

Sensors 14, 16 and 18 are connected, through pulse shapers 20, 22 and 24 respectively, to the control inputs of three counting devices 26, 28 and 30 respectively. The counting inputs of the counting devices are connected to an oscillator 32 which generates clock pulses at a high pulse repetition rate or frequency such as 10 MHz. The outputs of the counting devices 26, 28 and 30 are connected to an averaging and reciprocal circuit 34 which will be explained in greater detail in connection with FIGS. 4 and 5. The outputs of pulse shapers 20, 22 and 24 are coupled to a monitoring device 36.

Figure 2:
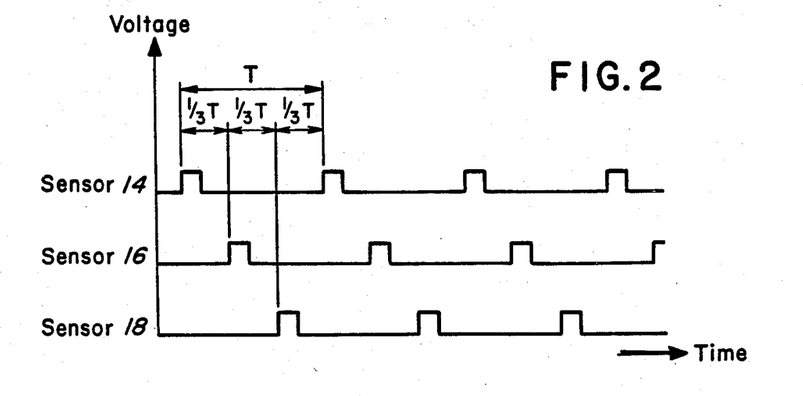
FIG. 2 is a waveform diagram showing pulses generated in the circuit of FIG. 1.

Designating the spacing between corresponding points of adjacent teeth 12 on disc 10 by $\phi$, the spacing between adjacent sensors 14 and 16 is equal to $\frac{2}{3}\phi$, and the spacing between sensors 16 and 18 is also $\frac{2}{3}\phi$. Consequently, as shown in FIG. 2, if the voltage pulses generated at the output of each of the sensors have a period T, the pulses generated by sensor 16 will lag those generated by sensor 14 by $\frac{2}{3}$ T and those generated by sensor 18 will lag those generated by sensor 16 by the same phase displacement when the disc rotates in the direction of arrow 11.

Figure 3:
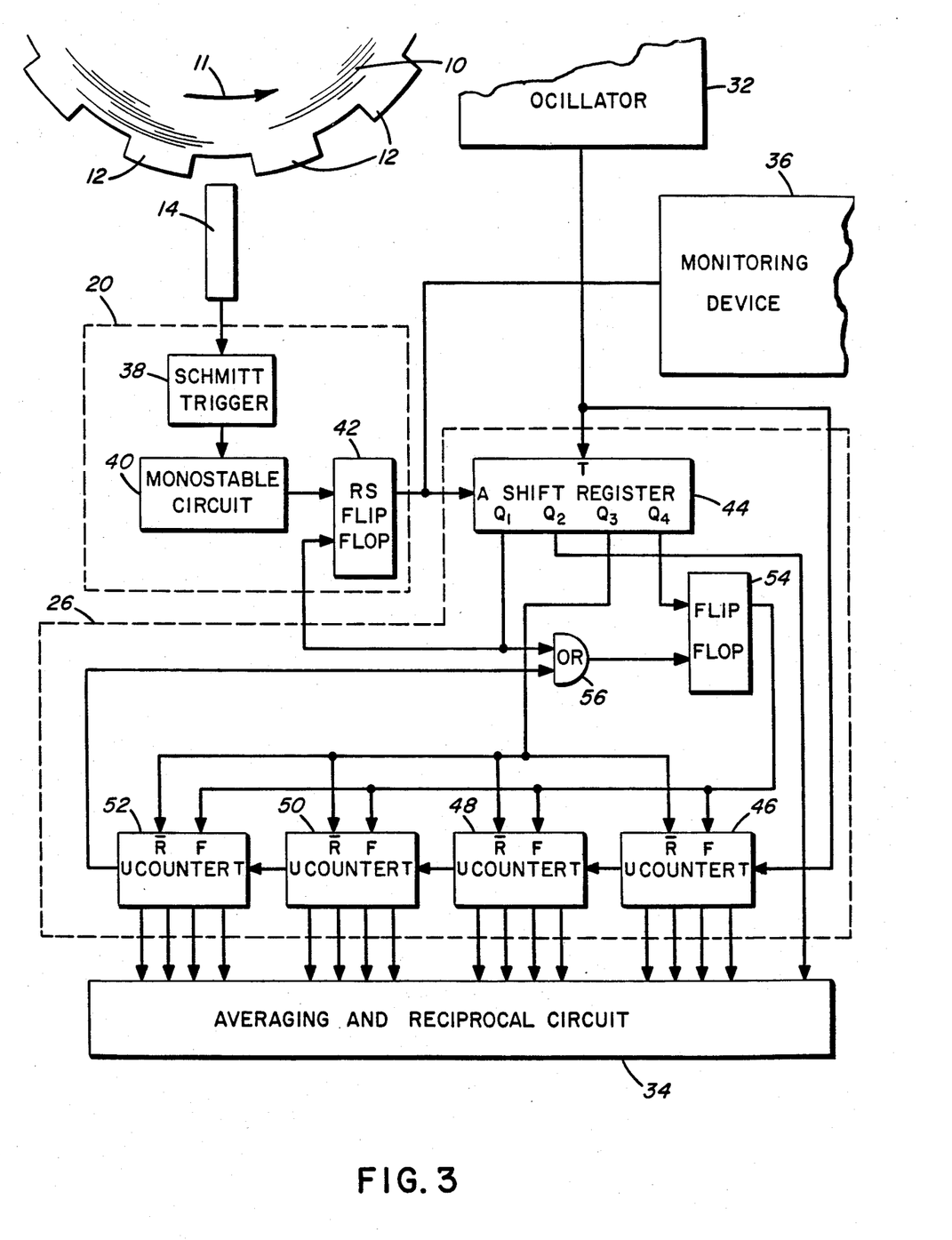
FIG. 3 shows pulse shaping and counting circuits employed in the invention.

FIG. 3 shows the pulse sensor 14 and the circuits comprising pulse shaper 20 and counting device 26. Sensors 16 and 18 and the circuits comprising pulse shapers 22 and 24 and counting devices 28 and 30 are identical and, therefore, in order to avoid unnecessary crowding of the drawing, have been omitted.

As shown in FIG. 3, pulse sensor 14 is connected to a Schmitt trigger 38 which feeds a monostable circuit 40 having an output connected to the setting input of an RS flipflop 42, these three components comprising the pulse shaper 20. The pulse shaper 20 converts the leading edge of the pulse at the output of the sensor to a short needle or spike pulse which is generated at the output of flipflop 42. In the counting device 26, the noninverting output of flipflop 42 is connected with the data input A of a shift register 44 whose clock pulse input T is connected to the output of oscillator 32.

The shift register 44 has four stages $Q_1$, $Q_2$, $Q_3$ and $Q_4$ whose outputs are connected respectively to the reset input of flipflop 42, the averaging and reciprocal circuit 34, the erase inputs R of four four-digit binary counters 46, 48, 50 and 52 and the setting input of a bistable element or flipflop 54. The noninverting output of flipflop 54 feeds the enabling inputs F of binary counters 46, 48, 50 and 52, the clock pulse input T of binary counter 46 is connected to the oscillator 32 and the clock pulse inputs T of binary counters 48, 50 and 52 are connected in series to the U terminal of the preceding counter 46, 48 and 50 respectively. The outputs of binary counters 46, 48, 50 and 52 are connected to the averaging and reciprocal circuit 34. In order to prevent the binary counters from running over, the carry output of counter 52 is connected to the input of an OR gate 56 having a second input connected to the $Q_1$ output of the shift register 44. The OR gate 56 feeds the erase input of flipflop 54.

Figure 4:
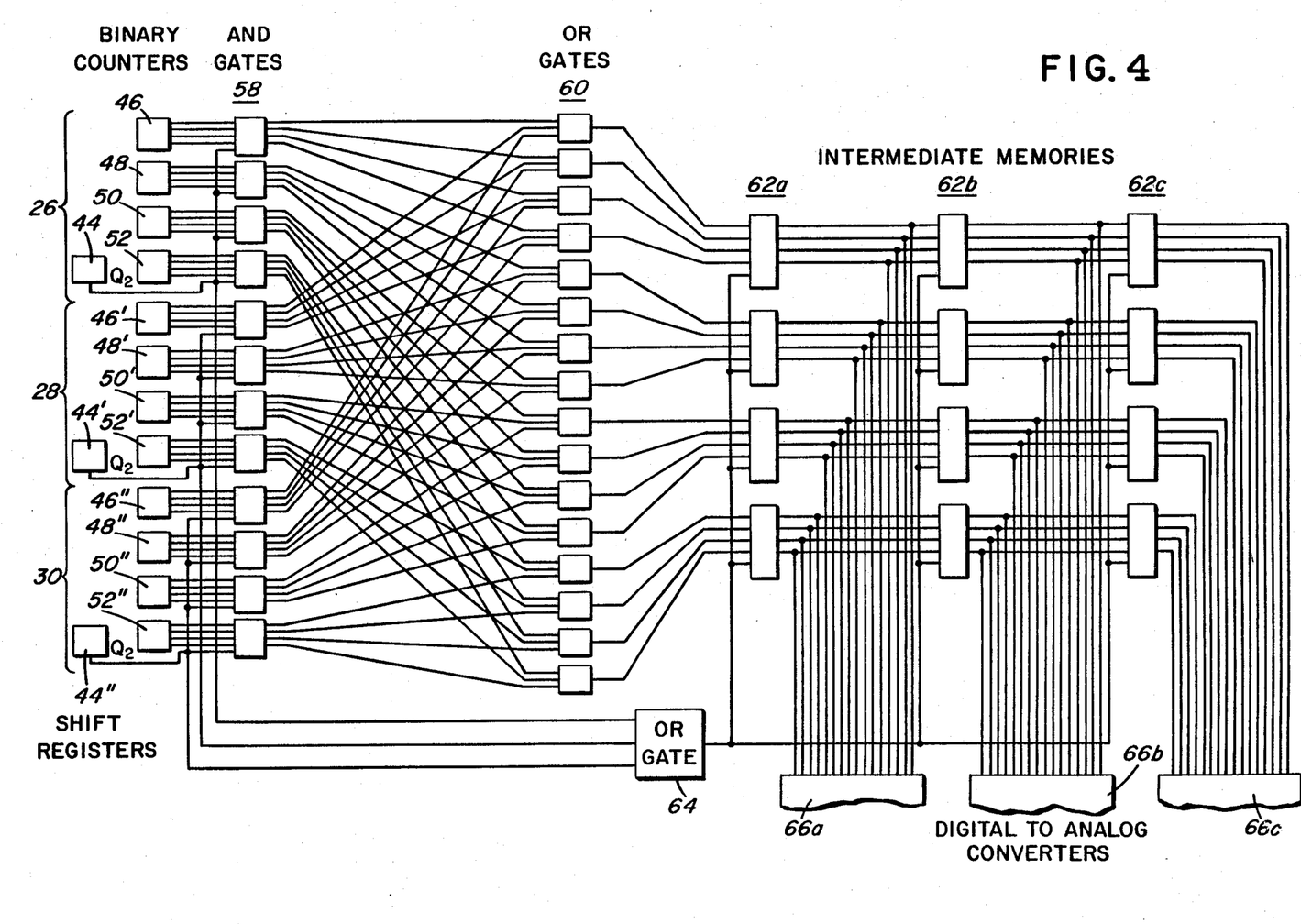
FIG. 4 is a circuit diagram showing coding and memory circuits used in the invention.

Referring to FIG. 4, all three counting devices 26, 28 and 30 are shown with the binary counters and shift registers of counting devices 28 and 30 being identified by the same numerals as those used for counting devices 26 except that primes and double primes have been added. The four outputs of each of the twelve binary counters 46, 48, 50, 52, 46', 48', 50', 52', 46'', 48'', 50'' and 52'' are connected respectively to the input of one of twelve AND gates 58, and the $Q_2$ output of shift register 44 is coupled to the inputs of the AND gates 58 associated with binary counters 46, 48, 50 and 52, the $Q_2$ output of shift register 44' is coupled to the inputs of the AND gates associated with binary counters 40', 48', 50' and 52' and the $Q_2$ output of shift register 44'' is coupled to the inputs of the AND gates associated with binary counters 40'', 48'', 50'' and 52''.

Each of the four outputs of the AND gates 58 is connected to an input of one of sixteen OR gates 60 in the matrix shown in FIG. 4, each OR gate having three inputs connected to the outputs of AND gates 58. The outputs of the OR gates 60 are coupled to the inputs of shift registers 62a, 62b and 62c which act as intermediate memories, the three shift registers being connected in series to provide sixteen parallel stages. The clocking of the shift registers 62a, 62b and 62c is effected via an OR gate 64 having inputs coupled to the $Q_2$ outputs of shift registers 44, 44' and 44''. The sixteen outputs of each of the intermediate memories or shift registers 62a, 62b and 62c are connected to a corresponding digital-to-analog converter 66a, 66b and 66c.

Figure 5:
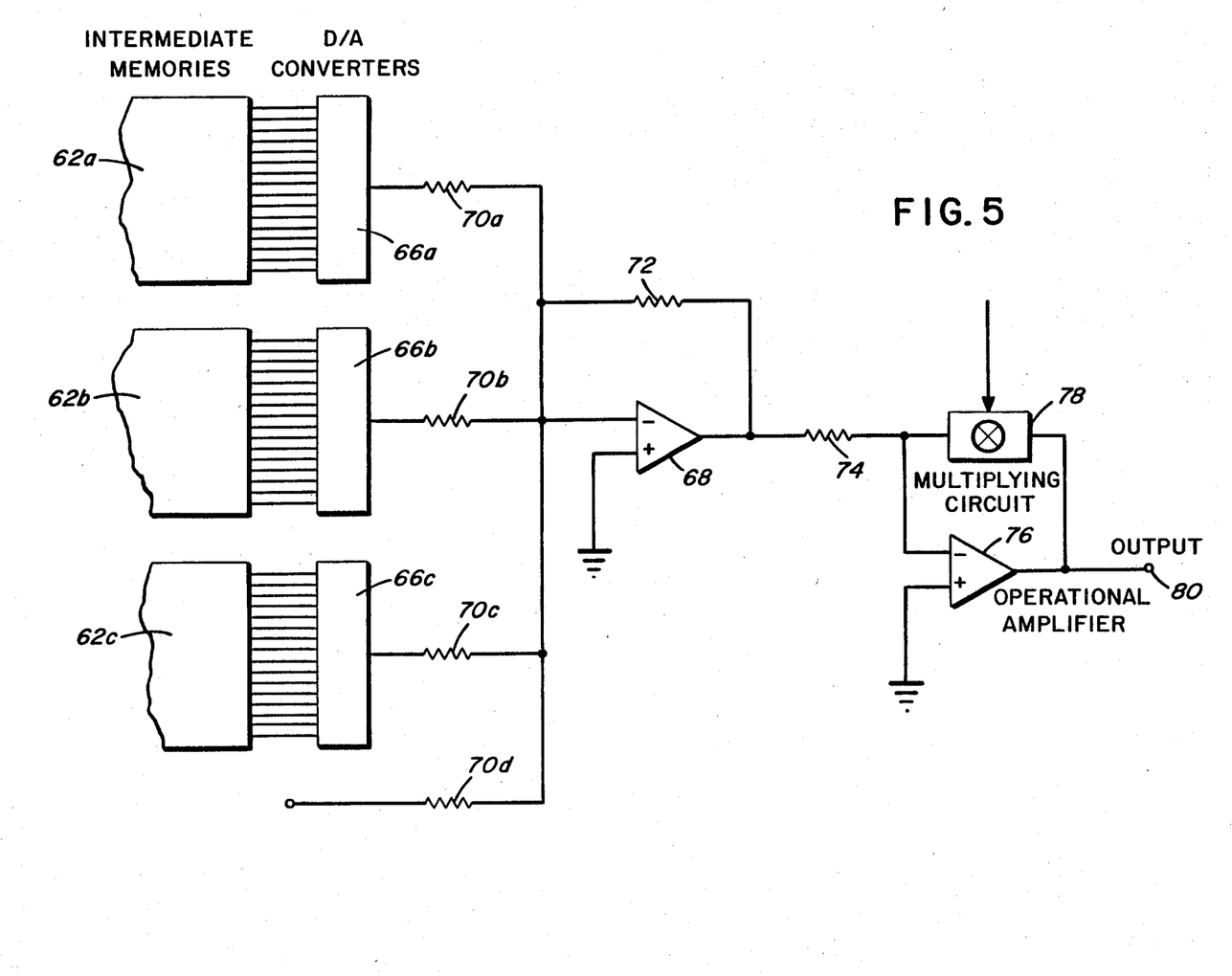
FIG. 5 shows averaging and reciprocal circuits used in determining the speed of the machine.

As shown in FIG. 5, the outputs of the D/A converters 66a, 66b and 66c are connected to the negative input of a summing amplifier 68 through weighting resistor 70a, 70b and 70c. The output of summing amplifier 68, which has a feed back resistor 72, is coupled through an input resistor 74 to the negative input of an operational amplifier 76 having a multiplier circuit 78 in its feedback path. The operational amplifier 76 operates as a divider and forms an analog value at its output terminal 80 which corresponds to the speed of the rotating machine in revolutions per minute. The positive inputs of both amplifiers 68 and 76 are grounded.

In principal, digital measuring is more accurate than analog measuring. However, digital measuring has the disadvantage that the time required for calculations is too long or the hardware required too expensive. The three channel arrangement avoids the further disadvantage that pitch error strongly influences accuracy. By using three sensors in the manner described, the pitch error of one tooth is eliminated by considering the reverse pitch error of the following tooth.

Referring to FIG. 3, the binary counters 46, 48, 50 and 52 sum the clock pulses generated by oscillator 32 in the interval between adjacent pulses generated by sensor 14. Shift register 44 controls the introduction of the pulse into the binary counters and the reading out of the counter contents, the counting process being enabled via flipflop 54 by shift register 44 and interrupted at the end of the counting time. Thereafter, the contents of binary counters 46, 48, 50 and 52 are read out and the counter contents erased before they are again enabled. The operation of pulse sensor 16 and 18, and their associated circuits, is identical.

As shown in FIG. 4, the outputs of the binary counters 46, 48, 50, 52, 46', 48', 50', 52', 46'', 48'', 50'' and 52'', which are revolution-dependent momentary values of successive clock pulses measured at three successive times, are stored in shift registers 62a, 62b and 62c comprising series-connected intermediate memories. The counter contents are converted into analog values during the storage period by A/D converters 66a, 66b and 66c, averaged in amplifier 68 and the reciprocal of the average generated in operational amplifier 76 having multiplier circuit 78 in its output.

In the majority of applications, two pulse sensors are sufficient to permit detection of the speed of the rotating machine and also provide protection against the malfunctioning of one of the pulse sensors and its associated circuits. With this arrangement, it is possible to obtain, with few complications, error signals proportional to the number of revolutions of the machine and then convert this signal into a voltage proportional to the speed of the machine in revolutions per minute.

In another embodiment of the invention, the number of intermediate memories corresponds to the number of parallel locations emanating from the counters, with the outputs of the intermediate memories being connected to the data bus of a microprocessor in such a manner that the intermediate memories can be read out via the address bus of the microprocessor and via the read-out control line. In this arrangement the rpm are generated digitally resulting in greater accuracy.

In another embodiment, for the purpose of interpolation, the difference between the intermediately stored memory content and the content of the newly addressed memory cell is formed and this difference is multiplied by the difference between the counter state and the content of the memory cell. The product is subtracted from the content of the first addressed memory cell.

The interpolation takes place in a very short time; thus, it is possible to reduce the memory requirement for the table values since interpolation can take place more frequently because of the relatively high speed with which this step is carried out.

In still another embodiment, the difference between the two bytes of the intermediately stored revolution value and the newly addressed revolution value is multiplied by the lower valued byte of the address and thereafter the product is rounded up or down to a whole byte and the result is subtracted from the higher value byte. When this is done, the interpolation expenditures in microprocessors having an 8-bit data width are reduced to a minimum. With fast interpolation it is possible to employ microprocessors having a relatively short cycle time for the determination of the number of revolutions with the required high resolution capability.

A different identification is associated with the pulses from each pulse generator and these pulses are fed to a monitoring device which selectively indicates the absence of pulses from one pulse generator and also indicates the direction of rotation of the machine being monitored from the sequence of incoming pulses. This arrangement indicates the failure of a pulse generator immediately and, at the same time, which pulse generator is involved. Steps can be taken at once to eliminate the problem without having to interrupt the ongoing compilation of measured values. Thus, the reliability of the detection is improved considerably. This will be explained in more detail with reference to FIGS. 6–9.

Figure 6:
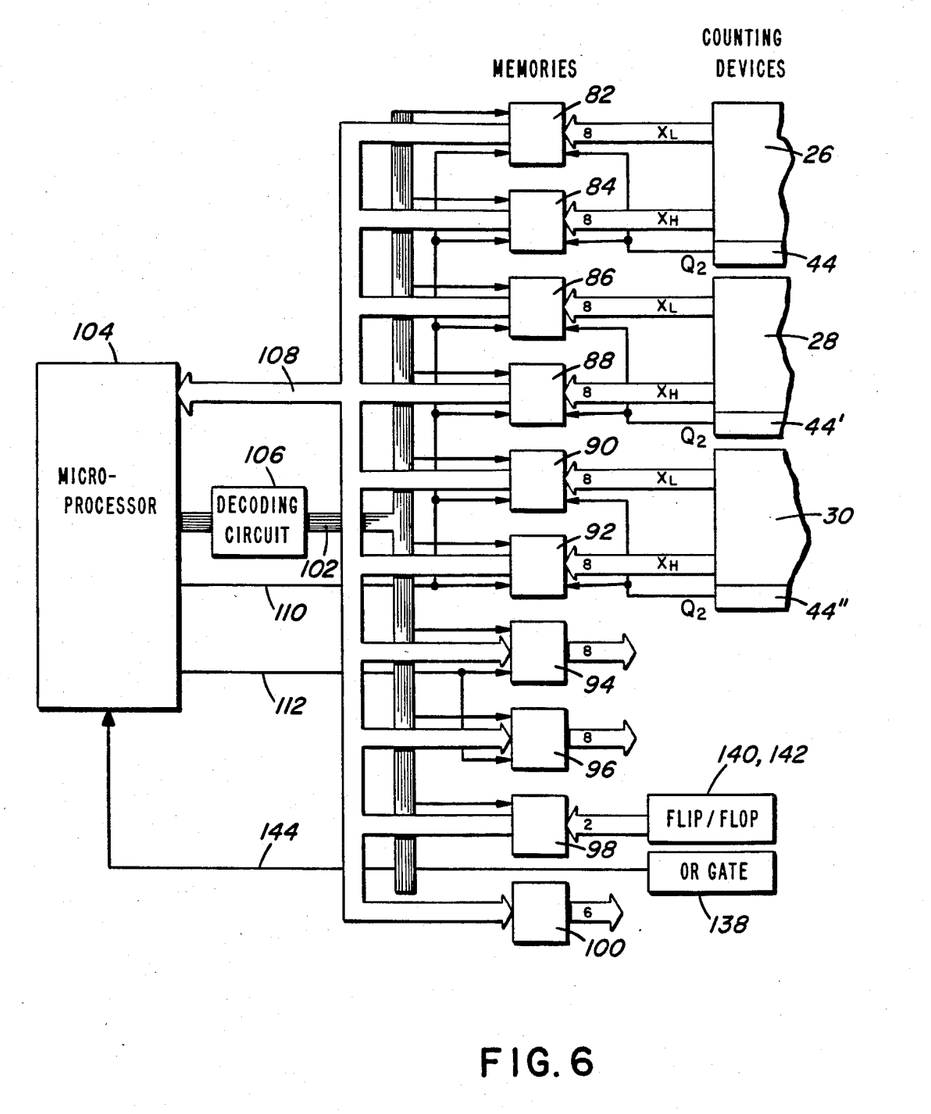
FIG. 6 is a block diagram of another averaging and reciprocal circuit.

Referring to FIG. 6, the counting devices 26, 28 and 30 are connected directly to intermediate memories 82, 84, 86, 88, 90 and 92. These intermediate memories are divided into groups of 8 bits, the lower valued bits $X_L$ from the contents of counters 26, 28 and 30 being coupled to memories 82, 86 and 90 respectively and the higher valued bits from the counters 26, 28 and 30 being coupled to memories 84, 88 and 92 respectively. Each memory has its address input connected to the address bus 102 of a microprocessor which may be a type 8748 manufactured by INTEL. Between the address bus 102 and the microprocessor 104 there is connected a decoding circuit 106 which converts the address into individual signals so that each input or output memory can be addressed individually.

The write-in inputs of memories 82 and 84 are triggered by the $Q_2$ output of shift register 44, of memories 86 and 88 by the $Q_2$ output of register 44' and of memories 90 and 92 by the $Q_2$ output of register 44". The data outputs of memories 82 to 92 are connected to the data bus 108 of microprocessor 104.

A read line 110 of microprocessor 104 feeds the read inputs of memories 82, 84, 86, 88, 90 and 92 and a write line 112 couples the microprocessor to output memories 94 and 96.

Figure 7:
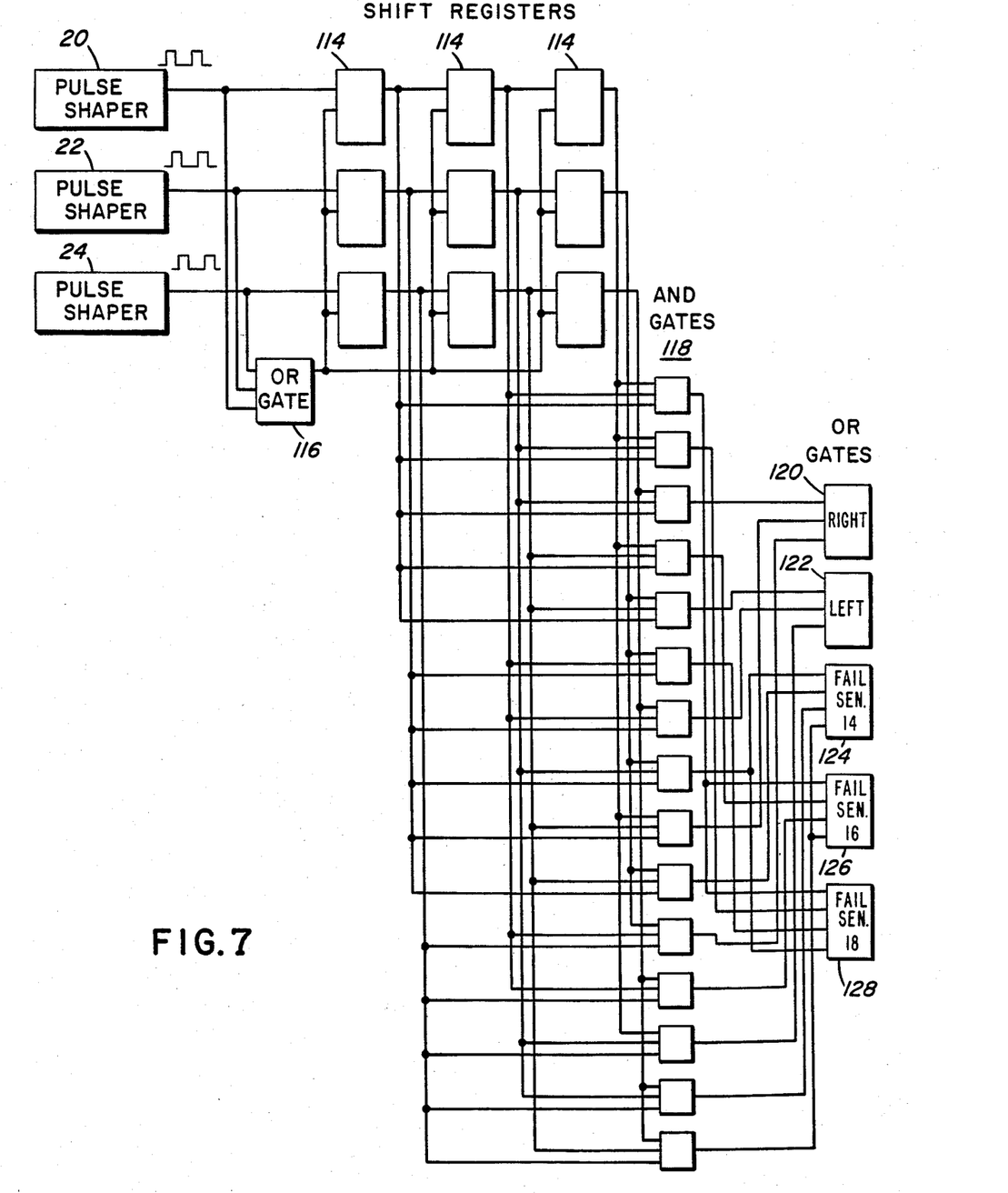
FIG. 7 is a diagram showing circuits for monitoring the operability of the pulse generators and direction of machine rotation.

Referring to FIGS. 1, 3 and 7, the monitoring device 36 includes a shift register consisting of a matrix of nine D type flipflops 114 (FIG. 7) whose D inputs are connected to the RS flipflops 42 (FIG. 3) forming components of pulse shapers 20, 22 and 24. The D flipflops 114 are clocked by the pulses of the RS flipflops 42 of the corresponding pulse shapers via an OR gate 116.

The outputs of the D type flipflops 114 feed a coding circuit consisting of fifteen AND gates 118 having their ouputs connected in a matrix to the inputs of five OR gates 120, 122, 124, 126, and 128. If none of the sensors have failed, or if there has been a failure of one or two sensors, certain patters of bits will exist in the D- flipflop matrix. Each of the pulse shapers, 20, 22 and 24 has an associated row of D- flipflops which indicates whether the pulse from this row or channel was the last, the penultimate or the antipenultimate pulse. For example, if the matrix 010
100
001 exists, this means that the last pulse was generated by pulse shaper 22, the penultimate pulse by pulse shaper 20 and the antipenultimate pulse by pulse shaper 24. The design of the matrix is such that only the AND gate 118, which is third from the top in FIG. 7, has all three of its inputs driven high thereby setting the OR gate 120 to indicate that rotation is to the right.

As another example, if the D- flipflop matrix is 010
101
000 only the sixth AND-gate 118 from the top will have a high output thereby setting OR-gate 128 to indicate that sensor 18 has failed. The flipflops 114, AND gates 118 and OR gates 120, 122, 124, 126 and 128 are interconnected to provide a malfunction signal at the outputs of the OR gates in the absence of a pulse at the output of one of the pulse converters 20, 22 or 24. Also, the direction of rotation of the machine being monitored is indicated at the outputs of the OR gates. The OR gate outputs are coupled to terminals 130 and 132 of monitoring device 36 to indicate a malfunction and the direction of machine rotation respectively. For example the OR-Gates 120, 122, 124, 126, 128 each drive a light-emitting diode.

In operation, three bits are stored in the D flipflops 114 of the monitoring device 32 at three successive pulse generator clock pulses from which three comparison values are formed according to a code. If there is no coincidence with given comparison values, a fault report is made. The clock pulse generator pulses also provide information from which the direction of machine rotation can be determined with the time succession of the pulses being decisive for this determination.

Figure 8:
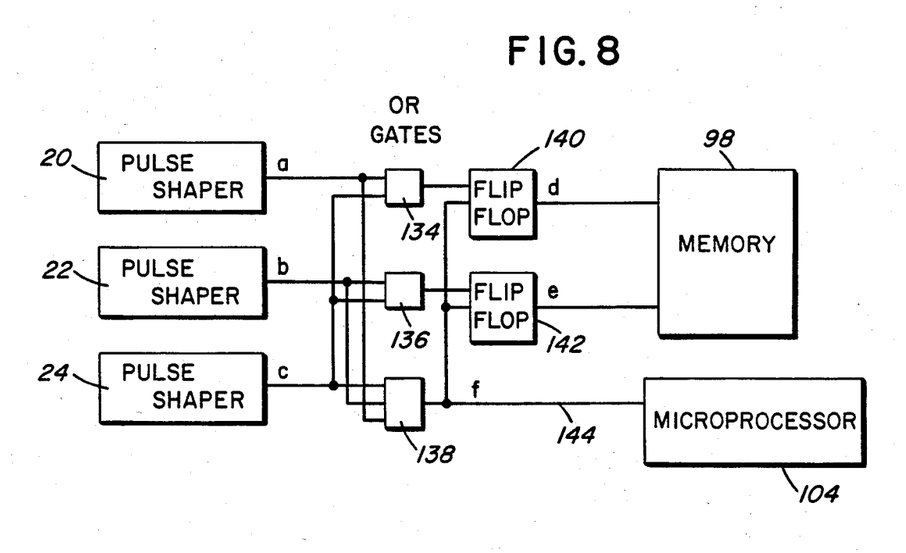
FIG. 8 shows a circuit for the binary digit recognition of momentary probe signals.
Figure 9:
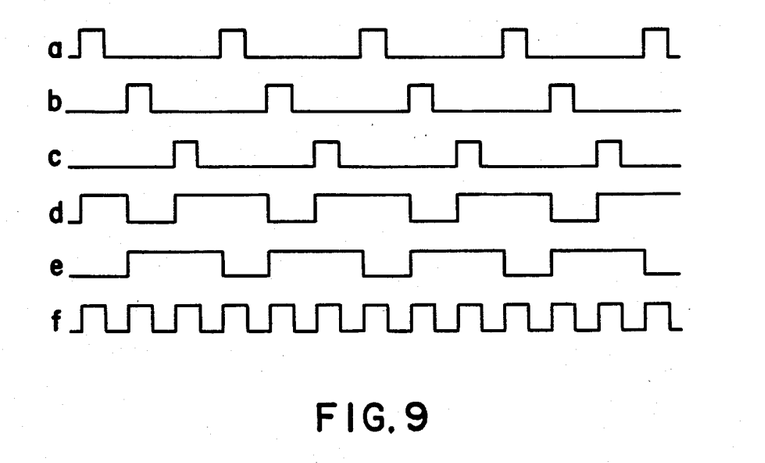
FIG. 9 is a waveform diagram showing signals generated in the circuit of FIG. 8.

Referring to FIG. 8, the outputs of pulse shapers 20, 22 and 24 are also coupled to the inputs of OR gates 134, 136 and 138 respectively. The outputs of gates 134 and 136 are connected to the D inputs of D type flipflops 140 and 142 respectively whose clock pulse inputs are connected to the output of OR gate 138. OR gate 138 receives its input from all three pulse shapers 20, 22 and 24 to provide a means for identifying each of the pulse sensors 14, 16 and 18 and their respective pulse shaper circuits 20, 22, 24. That is, the outputs of the D flipflops 140 and 142 provide the identification 01 for the first pulse sensor 114 and pulse shaper 20, 10 for the second sensor 16 and pulse shaper 22, and 11 for the third sensor 18 and pulse shaper 24. The waveforms at points a through f of the circuit of FIG. 8 are shown in FIG. 9.

The outputs of the D flipflops 140 and 142 are each connected to the input of memory 98 which has its output connected to the microprocessor 104 in the same manner as the memories 82, 84, 86, 88, 90 and 92 (see FIG. 6) are connected to the microprocessor. The OR gate 138 feeds, via a lead 144, the interrupt input of the microprocessor 104.

Output memories 94 and 96, having their input connected to the address bus 102, the data bus 108 and the write line 112, provide intermediate storage of the speed of machine rotation in revolutions per minute as provided by the microprocessor 104. Memory 100 is connected to the microprocessor 104 in the same manner as memories 94 and 96 to provide intermediate storage of the system and probe error reports as well as the direction of rotation as six high-low signals.

In the microprocessor 104 the pulses summed by the counting devices 26, 28 and 30 are processed further, the microprocessor 104 being synchronized via line 144 with clock pulse generator pulses from the output of OR gate 138. The counter contents stored in memories 82, 84, 86, 88, 90 and 92 are read out by the microprocessors 104 as required. Preferably, the microprocessor has a data bus 108 with a width of 8 bits (1 byte) and an address bus 102 having a width of 16 bits (2 bytes). In the microprocessor 104, the reciprocal is formed of a 2 byte number.

A register in the RAM area of the microprocessor 104 is used as a shift register. At any interrupt from OR gate 138, the register is shifted twice to the left, the contents of the two-bit memory 140, 142 is OR'd in the two least significant bits of the register, and the two most significant bits are AND'd. The content of the register is then used as an address to a memory table in the ROM area. The predetermined bit pattern from this memory is transmitted via the data bus to the memory 100.

The six bits indicates:
Disturbance at all sensors
Failure of sensor 18
Failure of sensor 20
Failure of sensor 22
Rotation of machine to right
Rotation of machine to left.

If the counter reaches a rated state of 10,000 which corresponds to an oscillator frequency of 10 MHz and a tooth frequency of 1000 Hz, the reciprocals become very small and a decimal point calculation would have to be introduced. This disadvantage is overcome by multiplying the reciprocal by $10^8$. At the rated speed, the result is therefore $$10^8/10,000 = 10,000,$$

generation of the reciprocal being characterized by division of the number $10^8$ by the counter state. While various number systems could be used, binary processing is preferred.

The method according to the invention is based on a combination of fixed result storage and processing. This will be explained below with the aid of an example in which, for ease of explanation, all values are given in hexadecimal form. One byte is thus expressed by two numbers employing the characters 0, 1, 2, 3, 4, 5, 6, 7, 8, 9, A, B, C, D, E, F.

For a machine speed of 90% of the rated number of revolutions, the counter will record $$10 \text{ MHz}/900 \text{ Hz} = 11,111 \text{ pulses.}$$

This value is expressed hexadecimally as 2B 67, the higher valued byte $x_H$ being 2B and the lower valued byte $x_L$ being 67.

At address ∅1 ∅∅ to ∅1 FF and ∅2 ∅∅ to ∅2 FF in the memory, there is found, for example, the y results of the whole number x values, i.e. the higher valued y bytes in the range from ∅1 ∅∅ to ∅1 FF and the lower valued y bytes in the range from ∅2 ∅∅ to ∅2 FF. The higher valued address byte determines the value of the y byte while the lower valued address byte is the higher valued x byte $x_H$.

In the specific example, the microprocessor receives x = 2B 67. With $x_H$ = 2B it receives $y_{HxH}$ = 23 from the memory at the address ∅1 2B and $y_{LxH}$ = 7B from the memory at the address ∅2 2B. If the counter content were exactly 2B ∅∅, the reciprocal would be directly available with y = 23 7B. However, the lower valued x byte $x_L$ has the value 67. Therefore, the microprocessor increments the higher valued x byte by 1 and reads from the memory, at the addresses ∅1 2C and ∅2 2C, the y value 22 AD which corresponds to an x value of 2C ∅∅. Between the two y values $y_{xH}$ = 23 7B and $y_{xH+1}$ = 22 AD, interpolation is carried out with the aid of the lower valued x byte.

The exact value of y lies between $y_{xH}$ and $y_{xH+1}$, i.e. between 23 7B and 22 AD. First, the difference is formed yxH = 23 7B − 22 AD = CE. Multiplying this difference by the lower valued x byte $x_L$ and dividing it by ∅1 ∅∅, produces the correction value y:

$$CE \cdot 67/\text{∅1 ∅∅} = 53,$$

the division by ∅1 ∅∅ being accomplished by omitting the lower valued byte from the result of the multiplication of CE·67.

Finally, the correction value yH = 53 is subtracted from the rough value $y_{xH}$ = 23 7B to obtain the true y value $$y = 23 \ 7B - 53 = 23 \ 28.$$

The calculating sequence
1. subtraction of two 2-byte numbers,
2. multiplication of two 1-byte numbers,
3. subtraction of one 1-byte number from one 2-byte number, is faster, for example, by a multiple than the division of a 4-byte number by a 2-byte number.

The preliminary storage of the rough results reduces the memory requirement to 512 bytes = ½ K byte, compared to storage of the real values but is fine enough to keep errors due to linearized interpolation at below 1 bit.

If a microprocessor is used, monitoring of the probe or determination of the direction of rotation is readily carried out. By twice shifting a register bit-wise and adding the probe identification (2 bits 01, 10, 11) in this register, the sequence of the last three probes can be represented in one byte, e.g.

$$0 0 1 1 0 1 1 0,$$

where the two lowest values bits identify probe 2, the next two higher bits identify probe 1 and the next two bits identify probe 3. The two highest valued bits are not used. If this byte is used as an address for a memory, the binary number 00000001 could be present in that memory, and has the following significance:

The 1 in the lowest valued position identifies left-hand rotation and the next higher position identifies right-hand rotation. This is followed by a position for the indication of a malfunction of the associated probe 14, 16 or 18. The third highest position serves to report a system malfunction.

For the binary number 00100110 in which the digits correspond to the above given association, there results the memory contents 00110000, where binary ones are present at the location associated with probe 18 and the system. These ones signal a malfunction of probe 18 and a malfunction of the system.

There exist only $3^3$ possibilities for this sequence, 1, 1, 1 . . . 3, 3, 3. Thus, only $3^3=27$ memory locations are required.

It will be understood that the above description of the present invention is susceptible to various modifications, changes and adaptations and the same are intended to be comprehended within the meaning and range of equivalents of the appended claims.

What is claimed:

1. Apparatus for measuring and monitoring the angular velocity of the shaft of a rotating machine, comprising:
   a plurality of sensors positioned adjacent the shaft of said rotating machine, each of said sensors generating sequential pulses having a period proportional to the angular velocity of said shaft, said pulses being generated at intervals such that, during the period between adjacent pulses from one sensor, pulses are generated by each of the others of said plurality of sensors;
   an oscillator for generating reference pulses at a predetermined pulse repetition rate;
   a plurality of counting devices coupled to respective ones of said plurality of sensors and to said oscillator, said counting devices counting the number of pulses generated by said sensors; and
   an averaging and reciprocal circuit coupled to the outputs of said counting devices for obtaining the average of the outputs of said counting devices and generating the reciprocal thereof, the output of said reciprocal circuit being proportional to the angular velocity of the shaft of said rotating machine in revolutions per unit time.

2. Apparatus as defined in claim 1 which further comprises a toothed disc attached to the shaft of said rotating machine for actuating said plurality of sensors, said sensors being positioned at a uniform position from each other about the circumference of said disc.

3. Apparatus as defined in claim 1 wherein three sensors are employed and the phase difference between the pulses generated by two of said sensors is two-thirds of the period of the pulses generated by the third sensor.

4. Apparatus as defined in claim 2 wherein three sensors are employed and the phase difference between the pulses generated by two of said sensors is two-thirds of the period of the pulses generated by the third sensor.

5. Apparatus as defined in claim 1 wherein each of said counting devices comprises a serial shift register and a plurality of binary counters coupled thereto, said apparatus further comprising a plurality of pulse shaper circuits coupling said sensors to the shift register in the associated counting devices, each of said pulse shaper circuits converting the leading edge of each pulse generated by its associated sensor to a spike pulse and applying said spike pulse to said shift register to actuate said binary counter.

6. Apparatus as defined in claim 5 wherein each of said pulse shaper circuits comprises a Schmitt trigger circuit having its input coupled to the output of the associated sensor, an RS flipflop and a monostable circuit, said monostable circuit coupling the output of said Schmitt trigger to an input of said RS flipflop, the spike pulse being applied to said shift register by said RS flipflop.

7. Apparatus as defined in claim 5 wherein each of said counting devices further comprises a bistable element and an OR gate, said bistable element and said OR gate each having first and second inputs and an output, said apparatus further comprising a plurality of intermediate memories having their input connected to the outputs of said binary counters; said shift register having a clock input coupled to the output of said oscillator, a first output coupled to the first input of said OR gate, a second output coupled to the enabling inputs of said intermediate memories, a third output coupled to the erase inputs of said binary counters and a fourth output coupled to the first input of said bistable element, the output of said bistable element being coupled to the enabling inputs of said binary counters, the carry output of said binary counters being coupled to the second input of said OR gate and the output of said OR gate being coupled to the second input of said bistable element.

8. Apparatus as defined in claim 7 wherein said plurality of intermediate memories are series-connected, the number of revolution-dependent momentary values of successive clock pulses contained in said binary counters being stored therein; and wherein said averaging and reciprocal circuit comprises a plurality of OR gates coupling the outputs of said binary counters and the second output of said shift register to the inputs of said intermediate memories, a plurality of digital-to-analog converters having their inputs coupled to the memory outputs of said intermediate memories, a summing amplifier having its input coupled to the outputs of said digital-to-analog converters, and an operational amplifier having its input coupled to the output of said summing amplifier, said operational amplifier including a multiplier coupled between the input and output terminals thereof for generating the quotient of the signal applied to the input of said operational amplifier.

9. Apparatus as defined in claim 8 which further comprises a plurality of AND gates coupling said binary counters to said OR gates, and said intermediate memories comprise shift registers, said registers being provided with three clock pulse stages for the repetitive intermediate storage of three successively measured binary counter contents.

10. Apparatus as defined in claim 7 which further comprises a microprocessor having a data bus, an address bus and a read-in control line, the number of intermediate memories corresponding to the number of parallel outputs of said counting devices, the outputs of said intermediate memories being coupled to the data bus of said microprocessor, said intermediate memories being read out via said address bus and said read-in control line.

11. Apparatus as defined in claim 10 wherein intermediate values can be determined between adjacent stored revolution values by means of a linear interpolation.

12. Apparatus as defined in claim 1 which further comprises a monitoring device coupled to the outputs of said plurality of sensors, said monitoring device selectively indicating the absence of a pulse from one of said sensors and indicating the direction of rotation of the shaft of said rotating machine as a function of the sequence of the pulses generated by said sensors, the pulses from each of said sensors having a specific identification.

13. Apparatus as defined in claim 12 which further comprises a plurality of pulse shaper circuits coupling said sensors to the associated counting devices, and wherein said monitoring device comprises a plurality of shift registers coupled to the outputs of said pulse shaper circuits, a coding circuit coupled to the outputs of said shift registers and a comparator coupled to the outputs of said coding circuit, said comparator having an output indicating the direction of rotation of said shaft and whether the pulses from said sensors coincide with said specific identification.

14. Apparatus as defined in claim 13 wherein each of said further shift registers comprises three series-connected D flipflops having their inputs jointly clocked by the pulses from said sensors, and said coding circuit and comparator comprise a plurality of AND and OR gates, the outputs of said OR gates indicating the direction of rotation of said shaft and the failure of a probe.

15. Apparatus as defined in claim 12 which further comprises first, second and third pulse shaper circuits coupling said first, second and third sensors to associated first, second and third counting devices, and wherein said monitoring device comprises a probe identifying circuit coupled to the outputs of said pulse shaper circuits, said probe identifying circuit including first and second D flipflops and first, second and third OR gates, said first OR gate coupling said first and third pulse shaper circuits to a first input of said first flipflop, said second OR gate coupling said second and third pulse shaper circuits to a first input of said second flipflop and said third OR gate coupling said first, second and third pulse shaper circuits to the second inputs of said flipflop, the outputs of said flipflops generating a binary number corresponding to the pulse shaper circuit which last generated a pulse and said third OR gate generating an output each time a tooth on said toothed disc passes a sensor.

16. Apparatus as defined in claim 15 which further comprises a microprocessor coupled to the outputs of said flipflops, said binary number corresponding to said pulse shaper circuit which last generated a pulse and said output generated each time a tooth on said toothed disc passes a sensor being fed into said microprocessor to form an address with the two previously received binary numbers.

17. Apparatus as defined in claim 16 wherein a memory is coupled to the data bus of said microprocessor to provide data bits corresponding to the direction of rotation of said shaft and the failure of one of said sensors.

18. The method of measuring and monitoring the angular velocity of the shaft of a rotating machine having a toothed disc attached thereto, comprising the steps of sensing the passage of each tooth on said toothed disc at a plurality of positions around the circumference of said disc and generating a pulse each time a tooth passes one of said positions, said positions being selected such that during the period between adjacent pulses from one position, pulses are generated at each of the other of said positions;

generating reference pulses at a predetermined pulse repetition rate;

counting the number of pulses generated at said plurality of positions with respect to the number of reference pulses generated;

averaging the number of pulses counted to obtain an average value; and generating the reciprocal of said average value, said reciprocal being proportional to the angular velocity of the shaft of said rotating machine in revolutions per unit time.

* * * * *